(12) United States Patent
Malhotra et al.

(10) Patent No.: US 7,535,823 B1
(45) Date of Patent: May 19, 2009

(54) METHOD AND SYSTEM FOR PROVIDING A SPARING MECHANISM IN A CIRCUIT-SWITCHED-TO-PACKET-SWITCHED INTERWORKING PERIPHERAL

(75) Inventors: Neeraj Malhotra, Raleigh, NC (US); Tuan Liao, Chapel Hill, NC (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1333 days.

(21) Appl. No.: 10/185,164

(22) Filed: Jun. 28, 2002

(51) Int. Cl.
*H04L 12/26* (2006.01)
(52) U.S. Cl. ...................... 370/216; 370/353
(58) Field of Classification Search ............... None
See application file for complete search history.

(56) References Cited

U.S. PATENT DOCUMENTS

| | | | | |
|---|---|---|---|---|
| 6,108,300 A * | 8/2000 | Coile et al. | ........ | 370/217 |
| 6,535,479 B1 * | 3/2003 | Ikematsu | ........ | 370/220 |
| 6,535,489 B1 * | 3/2003 | Merchant et al. | ........ | 370/244 |
| 2003/0090997 A1 * | 5/2003 | Lindstrom | ........ | 370/228 |
| 2003/0145108 A1 * | 7/2003 | Joseph et al. | ........ | 709/239 |

* cited by examiner

*Primary Examiner*—Chi H Pham
*Assistant Examiner*—Mohammad S Adhami
(74) *Attorney, Agent, or Firm*—Withrow & Terranova, P.L.L.C.

(57) ABSTRACT

The present invention provides an interworking peripheral module, which acts as a liaison between a circuit-switched telephone switch and a packet network. The interworking peripheral module includes a TDM module, such as a common equipment module, which cooperates with the telephony switch and two TDM-packet modules, which convert outgoing TDM traffic to packets and incoming packets to TDM traffic. The TDM-packet modules act in a redundant fashion, wherein one of the TDM-packet modules is active while the other TDM-packet module is inactive. The active TDM-packet module will convert the outgoing TDM traffic to packets and route the outgoing packets to a packet network via one or more routers. The inactive TDM-packet module will also convert the TDM traffic to packets in an identical fashion to the active TDM-packet module, but will drop the outgoing packets before they are routed to the packet network.

29 Claims, 4 Drawing Sheets

METHOD AND SYSTEM FOR PROVIDING A SPARING MECHANISM IN A CIRCUIT-SWITCHED-TO-PACKET-SWITCHED INTERWORKING PERIPHERAL

FIELD OF THE INVENTION

The present invention relates to telecommunications, and in particular to providing a sparing mechanism in a circuit-switched-to-packet-switched peripheral module to allow active calls to survive a device failure.

BACKGROUND OF THE INVENTION

There is a growing interest in the convergence of the public switched telephone network (PSTN) and the various packet networks, such as the Internet. The convergence of these networks requires technology that facilitates interworking in a uniform and effective manner. The next generation of unified networks will provide an open and scalable architecture to accommodate multiple vendors and protocols under a common packet network. There have been significant strides to overcome the many obstacles to providing telephony services on a packet network with the same level of performance and availability as on the PSTN today.

The traditional PSTN provides constant bandwidth streams of information between users. These media streams travel over dedicated circuits, which have proven to be very reliable and capable of recovering from various failures in a fast and uninterrupting manner. Given the high quality levels associated with the PSTN, subscribers expect and demand traditional quality regardless of the transmission medium. Thus, both the packet networks and the interworking devices between the packet networks and the PSTN must provide high quality of service levels and be able to recover from communication or network failures in a fast and uninterrupting manner.

Of particular interest is the potential failure of interworking peripheral modules, which act as liaisons between the PSTN and the packet networks. Traditionally, failures in these interworking peripheral modules have led to dropped calls and unacceptable interruptions during the call. Accordingly, there is a need for an interworking peripheral module capable of quickly recovering from a failure in a manner eliminating or minimizing interruption in service and any noticeable break in speech, and avoiding dropping a call upon a failure.

SUMMARY OF THE INVENTION

The present invention provides an interworking peripheral module, which acts as a liaison between a circuit-switched telephone switch and a packet network. The interworking peripheral module includes a TDM module, such as a common equipment module, which cooperates with the telephony switch and two TDM-packet modules, which convert outgoing TDM traffic to packets and incoming packets to TDM traffic. The TDM-packet modules act in a redundant fashion, wherein one of the TDM-packet modules is active while the other TDM-packet module is inactive. The active TDM-packet module will convert the outgoing TDM traffic to packets and route the outgoing packets to a packet network via one or more routers. The inactive TDM-packet module will also convert the TDM traffic to packets in an identical fashion to the active TDM-packet module, but will drop the outgoing packets before they are routed to the packet network.

Upon a failure of the active TDM-packet module, the inactive TDM-packet module will become active and immediately begin routing the outgoing packets to the packet network instead of dropping them. Conversely, the active TDM-packet module will become inactive, if it hasn't already completely failed. Notably, the interworking peripheral module is associated with an IP address to which incoming packets are routed from the packet network. Each TDM-packet module will include unique physical or MAC addresses, but will use address resolution protocols to ensure the physical or MAC address of the active TDM-packet module is associated with the IP address of the interworking peripheral module in the supporting router or router tables. Preferably, each TDM-packet module has a packet interface that is a gigabit Ethernet compatible interface.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
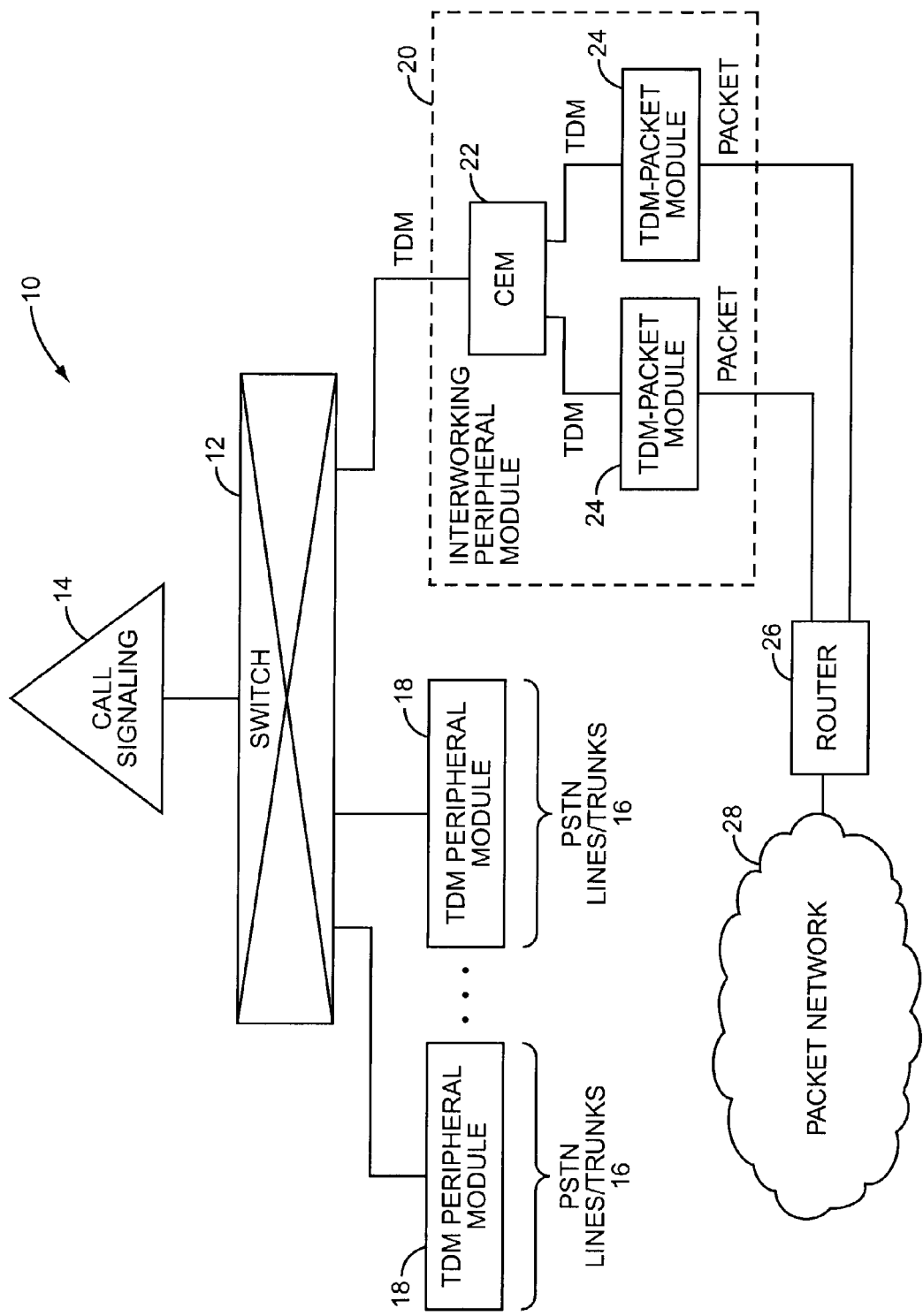
FIG. 1 illustrates a communication environment according to one embodiment of the present invention.

Referring to FIG. 1, a communication environment 10 is illustrated according to one embodiment of the present invention. The communication environment 10 includes a traditional public switched telephone network (PSTN) architecture, which includes a traditional switch 12, operating under the control of a call signaling entity 14 to facilitate circuit-switched connections between the various PSTN lines and trunks 16 supported by various time-division multiplexed (TDM) peripheral modules 18. The switch 12 and peripheral modules 18 operate in traditional fashion.

To facilitate interworking of the traditional PSTN architecture with a packet-based architecture, the switch 12 will cooperate with an interworking peripheral module 20, which will facilitate the conversion of TDM traffic to packet-based traffic, and vice versa. Typically, the interworking peripheral module 20 will appear substantially similar to a regular peripheral module 18 to the switch 12 and call signaling entity 14, such that call signaling and circuit switching occur in traditional fashion without substantial knowledge or modification of interworking by the switch 12 and call signaling entity 14.

In one embodiment of the present invention, a common equipment module (CEM) 22 provides a TDM-based interface module capable of directly interacting with the switch 12 and directing traffic to and from two TDM-packet modules 24, which provide the actual conversion between TDM traffic and packet traffic. The TDM-packet modules 24 are preferably identical and provide redundancy for failure protection. If one TDM-packet module 24 fails, the other will immediately take over and provide the necessary conversion of traffic from TDM traffic to packet traffic, and vice versa. The TDM-packet modules 24 typically connect to one or more routers 26 to facilitate packet communications with a packet network 28, which may support any type of electrical or optical packet switching. The term "packets" may include packets or frames. Preferably, the TDM-packet modules 24 and the one or more routers 26 are connected via a gigabit Ethernet network; however, those skilled in the art will recognize the various types of network connections and techniques to facilitate interaction between the TDM-packet modules 24 and the packet network 28. Further, a hardware interrupt between the two TDM-packet modules 24A and 24B may be used to provide signaling between the two indicating the respective activity or change in activity of either of the TDM-packet modules 24A and 24B.

Figure 2:
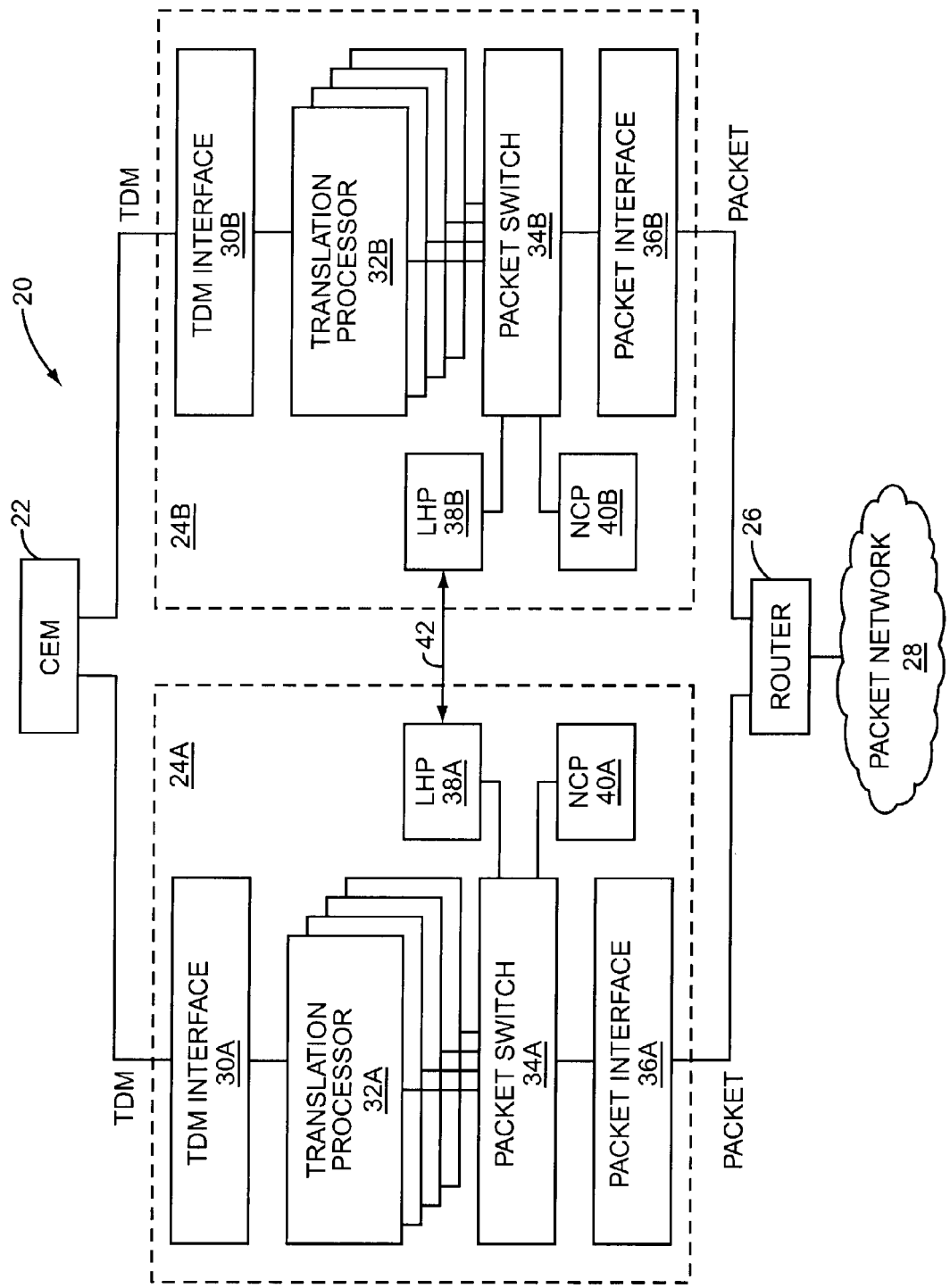
FIG. 2 is an interworking peripheral module according to one embodiment of the present invention.

Turning now to FIG. 2, a more detailed illustration of an interworking peripheral module 20 is illustrated according to one embodiment of the present invention. As illustrated, the CEM 22 provides redundant TDM connections to two TDM-packet modules 24A and 24B. The TDM-packet modules 24A and 24B will include TDM interfaces 30A and 30B, translation processors 32A and 32B, packet-switched logic 34A and 34B, packet interfaces 36A and 36B; and control systems, which are preferably made up of local host processors (LHPs) 38A and 38B and network control processors (NCPs) 40A and 40B.

For the sake of conciseness and clarity, only a detailed overview of TDM-packet module 24A is provided, since TDM-packet module 24B is preferably identically configured. The CEM 22 directly interacts with TDM interface 30A to support multiple bearer and control channels over one or more TDM trunks. TDM interface 30A will terminate these trunks and provide the various channels to one or more translation processors 32A, which will effectively convert outgoing TDM traffic to corresponding packets, and convert incoming packet traffic from packet switch 34A to TDM traffic. For outgoing traffic, packet switch 34A receives the packets corresponding to the various channels and delivers them to packet interface 36A for delivery to the router 26, which will route the packets as necessary over the packet network 28.

For incoming traffic, packets received from the router 26 at packet interface 36A are sent to packet switch 34A, which will deliver the incoming packet to the appropriate translation processor 32A that is handling the channel to which the incoming packets correspond. As such, packet switch 34A directs the incoming packets to the translation processor 32A corresponding to the appropriate bearer or control channel. In general, NCP 40A controls the routing provided by packet switch 34A between translation processor 32A and packet interface 36A. While the primary responsibility for NCP 40A is to control routing, LHP 38A provides the overall call control for TDM-packet module 24A and provides instructions to NCP 40A related to channel activation and deactivation.

When a call to be handled by the interworking peripheral module 20 is established, LHP 38A cooperates with the call signaling entity 14 through the CEM 22 to activate a channel for the call. Accordingly, LHP 38A will communicate with the call signaling entity 14 via a control channel and direct NCP 40A to map a bearer channel to a channel supported by one of the translation processors 32A. NCP 40A will then direct the translation processor to activate the channel. LHP 38A will also direct NCP 40A on how to control the call and route the packets through packet switch 34A. Thus, incoming packets are mapped through the appropriate translation processor 32A, converted to a TDM format, and placed on a proper bearer channel to TDM interface 30A. Outgoing traffic is converted to a packet format and routed to packet interface 36A via packet switch 34A, and on to the router 26 for routing through the packet network 28.

Figure 3A:
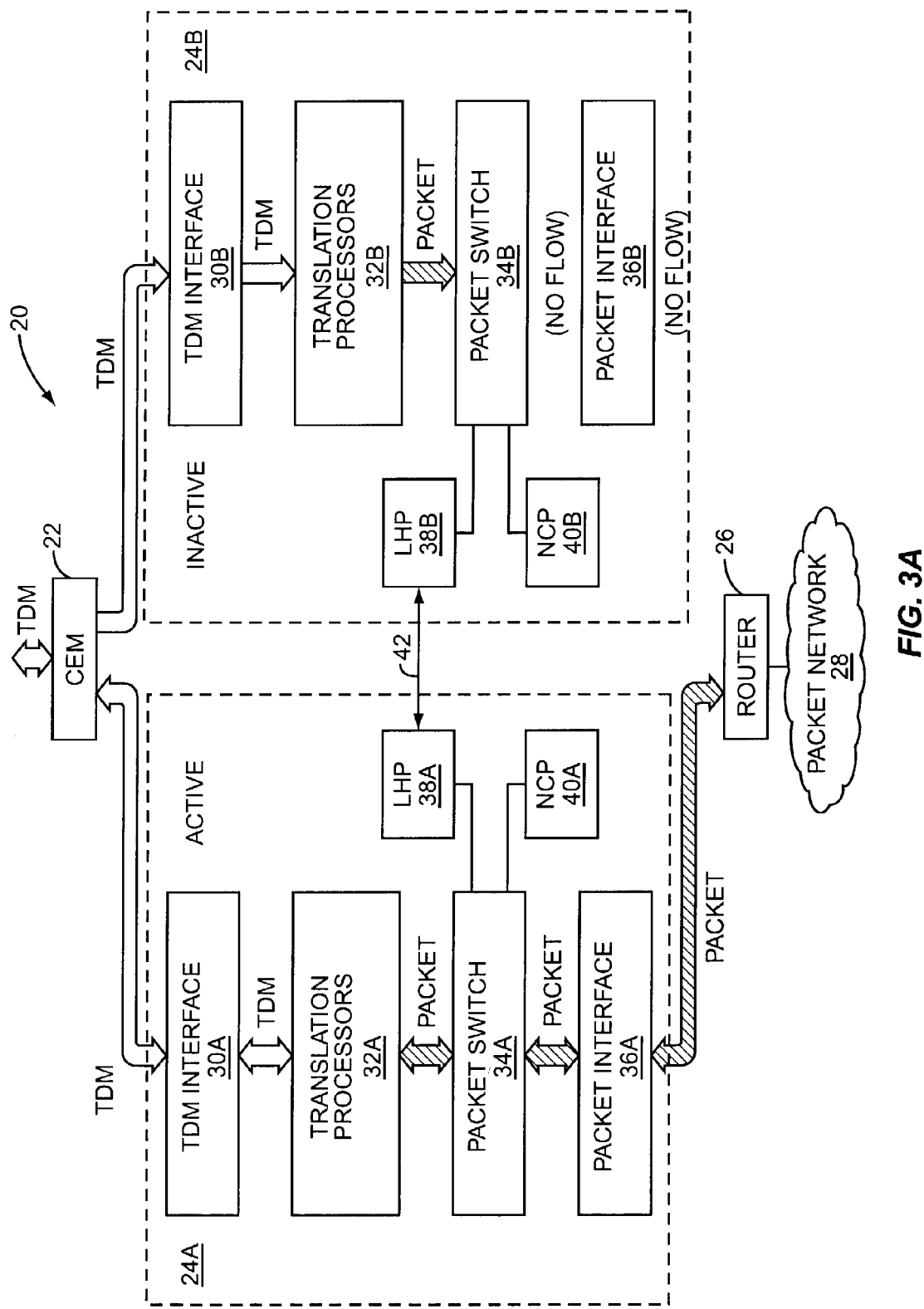
FIGS. 3A and 3B illustrate a traffic flow within the interworking peripheral module of FIG. 2 before and after a failure.
Figure 3B:
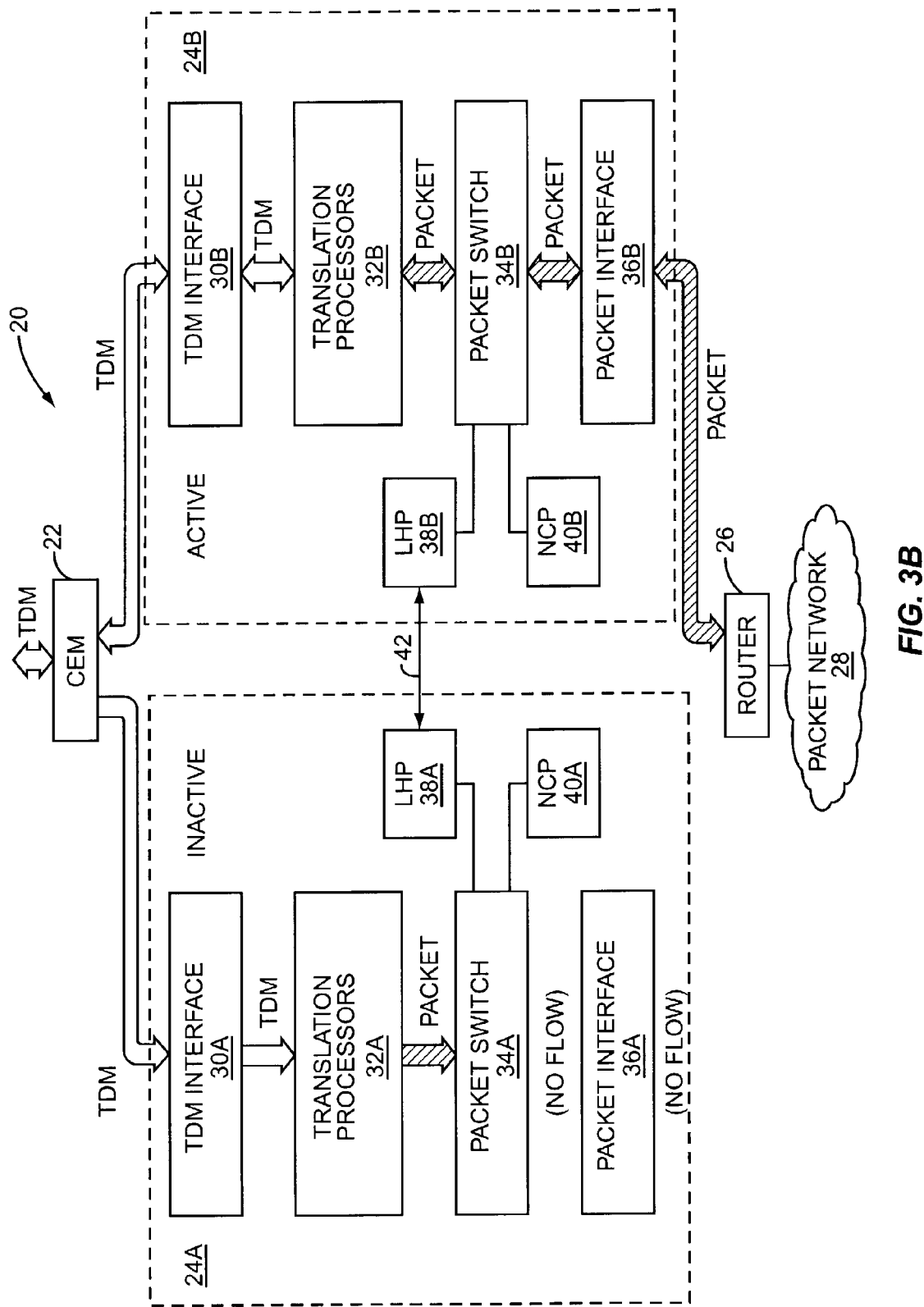

Turning now to FIGS. 3A and 3B, operation and interaction of the TDM-packet modules 24A and 24B are described in further detail. During operation, only one of the TDM-packet modules 24A, 24B is generally active at any given time. In FIG. 3A, TDM-packet module 24A is active and TDM-packet module 24B is inactive. For the present invention, the active TDM-packet module 24A is fully configured for bi-directional traffic flow between the CEM 22 and the router 26. In a redundant fashion, uni-directional traffic flow is established in an identical fashion in the inactive TDM-packet module 24B as in the active TDM-packet module 24A. Notably, outgoing traffic flow for the inactive TDM-packet module 24B stems only from the CEM 22 to packet switch 34B. For inactive TDM-packet module 24B, packet switch 34B drops the packets and does not direct packets to packet interface 36B for delivery to the router 26. The redundant processing of the outgoing traffic and the availability of the corresponding packets at packet switch 34B allows for a very fast and efficient transition from active TDM-packet module 24A to inactive TDM-packet module 24B when TDM-packet module 24A fails.

In essence, inactive TDM-packet module 24B continues to process the outgoing traffic flow during the failure and has packets available for delivery to the router 26 immediately upon detecting the failure and transitioning activity to the TDM-packet module 24B. To coordinate active and inactive TDM-packet modules 24A and 24B, LHPs 38A and 38B via the CEM 22 synchronize the channels used by translation processors 32A and NCPs 40A and 40B to control the routing in packet switches 34A and 34B. As noted, the routing for packet switch 34B in inactive TDM-packet module 24B results in dropped packets until a fail-over is detected, and then the routing that was provided by packet switch 34A is implemented. Preferably, activity management software (AMS) is provided in NCPs 40A and 40B to control switching and dropping of packets at packet switches 34A and 34B.

In operation, the interworking peripheral module 20 has a common IP address to the packet network 12 for bearer traffic; however, packet interfaces 36A and 36B will have unique physical or MAC addresses. To ensure proper operation, the active one of the TDM-packet modules 24A or 24B must have its MAC address associated with the primary IP address associated with the device or channel. Address resolution is preferably provided using the address resolution protocol (ARP) and controlled by NCPs 40A and 40B. Notably, the inactive one of the TDM-packet modules 24A or 24B may also have a management IP address to allow communications with the corresponding TDM-packet module 24A or 24B for service and management related activities. In general, NCPs 40A and 40B are configured to provide ARP messages to the router 26 to effectively control the mapping of the bearer and management (inactive) IP addresses to the MAC addresses of the respective TDM-packet modules 24A and 24B in an ARP table stored in the router 26.

Both the LHPs 38A and 38B and the NCPs 40A and 40B may include fault-monitoring software to help determine various types of faults that may occur on the TDM-packet modules 24A and 24B, respectively. If a problem occurs with active TDM-packet module 24A, LHP 38A will report the problem to call signaling entity 14, which will take the necessary steps to activate inactive TDM-packet module 24B, as illustrated in FIG. 3A. In particular, LHP 38A for active TDM-packet module 24A will report the fault to the CEM 22, which will forward the report to the switch 12. The switch 12 will instruct the CEM 22 to reset active TDM-packet module 24A through a hardware signal, and will cause active TDM-packet module 24A to go inactive. When active TDM-packet module 24A is reset to an inactive state, a hardware signal is provided via the hardware interrupt 42 to inactive TDM-packet module 24B, which will become active upon receiving the signal. Next, LHP 38B will send a message to the AMS in NCP 40B to reconfigure as an active module. NCP 40B will reconfigure packet switch 34B to stop dropping the packets and actually route the packets as formerly done by packet switch 34A in TDM-packet module 24A, which is currently inactive as illustrated in FIG. 3B. NCP 40A will also send an ARP message to the router 26 to update the IP address and MAC address associations such that the MAC address of the now active TDM-packet module 24B is associated with the primary IP address for the bearer channel. At this point, as represented in FIG. 3B, TDM-packet module 24B is active and TDM-packet module 24A is inactive. Once the now inactive TDM-packet module 24A becomes operable, LHP 38A will synchronize with LHP 38B to activate and set up the currently active channels and the outgoing packet flow from the CEM 22 is processed up to packet switch 34A, which will drop the flow until the currently active TDM-packet module 24B fails. The active TDM-packet module 24B will support bi-directional communications between the CEM 22 and the router 26 as discussed above in association with TDM-packet module 24A.

Accordingly, the present invention supports a rapid transition from one TDM-packet module 24A or 24B to another upon detection of a failure. Further, outgoing TDM traffic is converted to a packet form and dropped until the inactive TDM-packet module 24A or 24B becomes active. Upon becoming active, packets are no longer dropped, but are routed to the packet interface 36A or 36B for delivery to the packet network 28 via the router 26. Already converting the outgoing TDM traffic to packet form allows the inactive one of the TDM-packet modules 24A or 24B to immediately have packets available for routing upon becoming active. Incoming traffic from the packet network 28 is routed to the active TDM-packet module 24A or 24B due to the address resolution provided by the ARP message or like address resolution messaging.

Various fault detection mechanisms may be associated with various parts of the TDM-packet modules 24A and 24B. Although there are numerous fault triggers possible, common faults are triggered when fibers are moved from the packet interface 36A or 36B or the card is removed from its housing.

Those skilled in the art will recognize improvements and modifications to the preferred embodiments of the present invention. For example, activity can also be switched manually from one TDM-packet module to another through a switch management user interface to allow for in-service upgrades of software loads. All such improvements and modifications are considered within the scope of the concepts disclosed herein and the claims that follow.

What is claimed is:

1. A TDM-to-packet module for use in an interworking peripheral module having a redundant TDM-to-packet module, the TDM-to-packet module comprising:

a) a TDM interface adapted to provide bi-directional TDM communications with a module in the interworking peripheral module;
b) a packet interface adapted to provide a bi-directional packet interface with a packet network;
c) translation logic adapted to convert outgoing TDM traffic from the TDM interface to outgoing packets and incoming packets to incoming TDM traffic;
d) a packet switch adapted to route the incoming packets from the packet interface to the translation logic and selectively route the outgoing packets to the packet interface or drop the outgoing packets; and
e) control logic adapted to control the packet switch to route the outgoing packets to the packet interface when in an active mode and drop the outgoing packets when in an inactive mode.

2. The TDM-to-packet module of claim 1 wherein the interworking peripheral module has a primary bearer IP address for the incoming packets and the control logic is further adapted to initiate a message to at least one supporting router to provide address resolution upon transitioning from the inactive mode to the active mode to associate the primary bearer IP address with a physical address associated with the packet interface.

3. The TDM-to-packet module of claim 1 wherein when in the active mode, the control logic is further adapted to detect a fault and initiate a fault signal to send to a supporting switch via the TDM interface upon detecting the fault.

4. The TDM-to-packet module of claim 3 wherein the control logic is further adapted to transition from the active mode to the inactive mode upon receiving a reset message from the switch.

5. The TDM-to-packet module of claim 1 wherein the control logic is further adapted to initiate a signal to the redundant TDM-to-packet module upon transitioning from the active mode to the inactive mode.

6. The TDM-to-packet module of claim 1 wherein the control logic is further adapted to transition from the inactive mode to the active mode upon receiving a signal from the redundant TDM-to-packet module.

7. The TDM-to-packet module of claim 1 wherein the translation logic operates in an identical fashion with translation logic in the redundant TDM-to-packet module to ensure traffic and packets associated with each TDM channel are identically processed.

8. The TDM-to-packet module of claim 1 wherein the packet interface is a gigabit Ethernet interface.

9. An interworking peripheral module for providing a TDM-to-packet interface comprising:

a) a TDM module providing an interface to a telephony switch; and
b) two TDM-to-packet modules associated with the TDM module, each TDM-to-packet comprising:
 i) a TDM interface adapted to provide a bi-directional TDM interface with the TDM module;
 ii) a packet interface adapted to provide a bi-directional packet interface with a packet network;
 iii) translation logic adapted to convert outgoing TDM traffic from the TDM interface to outgoing packets and incoming packets to incoming TDM traffic;
 iv) a packet switch adapted to route the incoming packets from the packet interface to the translation logic and selectively route the outgoing packets to the packet interface or drop the outgoing packets; and v) control logic adapted to control the packet switch to route the outgoing packets to the packet interface when in an active mode and drop the outgoing packets when in an inactive mode, wherein when one of the TDM-to-packet modules is in the active mode the other of the TDM-to-packet modules is in the inactive mode.

10. The interworking peripheral module of claim 9 wherein the interworking peripheral module has a primary bearer IP address for the incoming packets and the control logic is further adapted to initiate a message to at least one supporting router to provide address resolution upon transitioning from the inactive mode to the active mode to associate the primary bearer IP address with a physical address associated with the packet interface.

11. The interworking peripheral module of claim 9 wherein when in the active mode, the control logic is further adapted to detect a fault and initiate a fault signal to send to a supporting switch via the TDM interface upon detecting the fault.

12. The interworking peripheral module of claim 11 wherein the control logic is further adapted to transition from the active mode to the inactive mode upon receiving a reset message from the switch.

13. The interworking peripheral module of claim 9 wherein the control logic is further adapted to initiate a signal to the other of the TDM-to-packet modules upon transitioning from the active mode to the inactive mode.

14. The interworking peripheral module of claim 9 wherein the control logic is further adapted to transition from the inactive mode to the active mode upon receiving a signal from the other of the TDM-to-packet modules.

15. The interworking peripheral module of claim 9 wherein the translation logic in each of the TDM-to-packet modules operates in an identical fashion to ensure traffic and packets associated with each TDM channel are identically processed.

16. A TDM-to-packet module for use in an interworking peripheral module having a redundant TDM-to-packet module, the TDM-to-packet module comprising:
a) means for providing bi-directional TDM communications with a module in the interworking peripheral module;
b) means for providing a bi-directional packet interface with a packet network;
c) means for converting outgoing TDM traffic from the means for providing the bi-directional TDM communications to outgoing packets and incoming packets to incoming TDM traffic;
d) means for routing incoming packets from the means for providing the bi-directional packet interface to the means for converting and selectively routing the outgoing packets to the means for providing the bi-directional packet interface or drop the outgoing packets; and
e) means for controlling the means for routing to route the outgoing packets to the means for providing the bi-directional packet interface when in an active mode and drop the outgoing packets when in an inactive mode.

17. The TDM-to-packet module of claim 16 wherein the interworking peripheral module has a primary bearer IP address for the incoming packets and the control logic is further adapted to initiate a message to at least one supporting router to provide address resolution upon transitioning from the inactive mode to the active mode to associate the primary bearer IP address with a physical address associated with the means for providing the bi-directional packet interface.

18. The TDM-to-packet module of claim 16 wherein when in the active mode, the means for controlling is further adapted to detect a fault and initiate a fault signal to send to a supporting switch via the TDM interface upon detecting the fault.

19. The TDM-to-packet module of claim 18 wherein the means for controlling is further adapted to transition from the active mode to the inactive mode upon receiving a reset message from the switch.

20. The TDM-to-packet module of claim 16 wherein the means for controlling is further adapted to initiate a signal to the redundant TDM-to-packet module upon transitioning from the active mode to the inactive mode.

21. The TDM-to-packet module of claim 16 wherein the means for controlling is further adapted to transition from the inactive mode to the active mode upon receiving a signal from the redundant TDM-to-packet module.

22. The TDM-to-packet module of claim 16 wherein the means for converting operates in an identical fashion with corresponding means in the redundant TDM-to-packet module to ensure traffic and packets associated with each TDM channel are identically processed.

23. A method for providing TDM-to-packet interworking using a TDM-to-packet module and a redundant TDM-to-packet module in an interworking peripheral module, the method comprising:
a) providing a bi-directional TDM interface with a module in the interworking peripheral module;
b) providing a bi-directional packet interface with a packet network;
c) converting outgoing TDM traffic from the TDM interface to outgoing packets and incoming packets to incoming TDM traffic;
d) routing the incoming packets from the packet interface to transition logic and selectively routing the outgoing packets to the packet interface or dropping the outgoing packets; and
e) controlling a packet switch to route the outgoing packets to the packet interface when in an active mode and drop the outgoing packets when in an inactive mode.

24. The method of claim 23 wherein the interworking peripheral module has a primary bearer IP address for the incoming packets and further comprising initiating a message to at least one supporting router to provide address resolution upon transitioning from the inactive mode to the active mode to associate the primary bearer IP address with a physical address associated with the packet interface.

25. The method of claim 23 wherein when the TDM-to-packet module is in the active mode, further comprising detecting a fault and initiating a fault signal to send to a supporting switch upon detecting the fault.

26. The method of claim 25 further comprising transitioning from the active mode to the inactive mode upon receiving a reset message from the switch.

27. The method of claim 23 further comprising initiating a signal to the redundant TDM-to-packet module upon transitioning from the active mode to the inactive mode.

28. The method of claim 23 further comprising transitioning from the inactive mode to the active mode upon receiving a signal from the redundant TDM-to-packet module.

29. The method of claim 23 wherein the converting step operates in an identical fashion with a similar step provided by the redundant TDM-to-packet module to ensure traffic and packets associated with each TDM channel are identically processed.

* * * * *